US012582131B2

(12) United States Patent
Meyer

(10) Patent No.: US 12,582,131 B2
(45) Date of Patent: Mar. 24, 2026

(54) METHOD FOR THE RAPID OSMOTIC DRYING OF FOOD

(71) Applicant: Texas Tech University System, Lubbock, TX (US)

(72) Inventor: Richard Schlomer Meyer, Harrison, ID (US)

(73) Assignee: Texas Tech University System, Lubbock, TX (US)

( * ) Notice: Subject to any disclaimer, the term of this patent is extended or adjusted under 35 U.S.C. 154(b) by 315 days.

(21) Appl. No.: 18/250,004

(22) PCT Filed: Oct. 27, 2021

(86) PCT No.: PCT/US2021/056742
§ 371 (c)(1),
(2) Date: Apr. 21, 2023

(87) PCT Pub. No.: WO2022/093887
PCT Pub. Date: May 5, 2022

(65) Prior Publication Data
US 2023/0404091 A1 Dec. 21, 2023

Related U.S. Application Data

(60) Provisional application No. 63/107,037, filed on Oct. 29, 2020.

(51) Int. Cl.
| | |
|---|---|
| *A23B 4/03* | (2006.01) |
| *A23B 7/02* | (2006.01) |
| *A23L 13/60* | (2016.01) |
| *A23L 13/77* | (2023.01) |

(52) U.S. Cl.
CPC ............. *A23B 4/03* (2013.01); *A23B 7/0205* (2013.01); *A23L 13/65* (2016.08); *A23L 13/77* (2023.01)

(58) Field of Classification Search
CPC ......... A23B 4/03; A23B 7/0205; A23L 13/65; A23L 13/77

USPC ......................................................... 426/105
See application file for complete search history.

(56) References Cited

U.S. PATENT DOCUMENTS

| | | | |
|---|---|---|---|
| 4,277,344 A | 7/1981 | Cadotte | |
| 5,246,587 A | 9/1993 | Tomaschke | |
| 5,254,261 A | 10/1993 | Tomaschke et al. | |
| 6,015,495 A | 1/2000 | Koo et al. | |
| 6,063,278 A | 5/2000 | Koo et al. | |
| 6,245,234 B1 | 6/2001 | Koo et al. | |
| 8,196,754 B2 | 6/2012 | Ho | |
| 8,602,223 B2 | 12/2013 | Qiu et al. | |
| 9,504,967 B2 | 11/2016 | Allen et al. | |
| 2009/0061052 A1* | 3/2009 | Visser ..................... | A23L 13/65 426/321 |
| 2014/0010932 A1* | 1/2014 | Freybe .................... | A23L 13/65 426/641 |
| 2018/0027831 A1* | 2/2018 | Shimoda .................. | A23B 2/70 |
| 2018/0310573 A1 | 11/2018 | Van De Nieuwelaar et al. | |

FOREIGN PATENT DOCUMENTS

| | | |
|---|---|---|
| WO | 2005082153 A1 | 9/2005 |
| WO | 2019241511 A1 | 12/2019 |

OTHER PUBLICATIONS

International Search Report and Written Opinion (ISA/US) PCT/US2021/056742 dated Jan. 31, 2022.

* cited by examiner

*Primary Examiner* — Brent T O'Hern
(74) *Attorney, Agent, or Firm* — Edwin S. Flores; Daniel J. Chalker; Chalker Flores, LLP

(57) ABSTRACT

The present invention includes a method and food product made by at least partially enclosing a food product with a water-permeable membrane; and contacting a brine or sugar solution with a water activity sufficiently high to draw water molecules across the water-permeable membrane and away from the food product to preserve the food.

11 Claims, No Drawings

METHOD FOR THE RAPID OSMOTIC DRYING OF FOOD

CROSS-REFERENCE TO RELATED APPLICATIONS

This application is the National Stage of International Application No. PCT/US2021/056742, filed on Oct. 27, 2021, claiming the priority of 63/107,037, filed on Oct. 29, 2020, the content of each of which is incorporated by reference herein.

TECHNICAL FIELD OF THE INVENTION

The present invention relates in general to the field of osmotically drying vacuum-sealed food.

STATEMENT OF FEDERALLY FUNDED RESEARCH

Not Applicable.

BACKGROUND OF THE INVENTION

Without limiting the scope of the invention, its background is described in connection with vacuum-sealed food.

Food drying is a method of food preservation that dates back to 12,000 B.C., and entails removing moisture from edible goods such as fruits, vegetables, fish, and meat in order to inhibit degradative enzymes and stop the growth of bacteria, yeasts, molds, and other microorganisms which break down food. Single-celled bacteria, for example, are roughly composed of 70% water and cannot grow or reproduce without the water in their environment. The presence of water plays such a critical role in food storage and preservation, that food manufacturers, food product designers, and food safety regulators routinely use the concept of "water activity" to determine a food product's susceptibility to microbial growth. Once adequately dried and stored, dehydrated foods become "shelf stable," meaning they can safely be stored at room temperate. In addition to significantly extending the shelf life of food, drying can preserve flavor, reduce food waste, save users money on groceries, and economize food storage—(dried food can take up less than one-sixth the space of its original size, and generally does not require storage in a refrigerator or freezer.)

A variety of methodologies exist to carry out the process of food drying. Ancient methods include sun drying, air drying, and the use of fire to draw out moisture. Modern approaches include convection drying, freeze drying, microwave-vacuum drying, spray drying, infrared radiation drying, combined thermal hybrid drying, solar drying, oven drying, and, the most common modern method, commercial electric food dehydrators. Another method is dry salting or "curing." Curing involves covering a food item—traditionally meats—with some combination of salt, sugar, nitrites, or nitrates. The high concentration of salt covering the food draws water out of the food's cells as well as the cells of unwanted microorganisms; thereby, killing bacteria and preserving the food along with its flavor and color.

While effective, many of the aforementioned methodologies have their own flaws. The most popular method, electric food dehydrators, are often expensive, noisy, and bulky. Drying food in the oven is time-consuming, requires constant monitoring of temperature and air circulation, consumes a large portion of energy, and is more likely to burn or under-dry the food. Sun drying, like solar drying, is unpredictable because users are unable to control temperature and/or humidity. Air drying often dries the exterior without reaching the interior of the food item, leads to the fading of color and flavor, and also does not allow the user to control temperature or humidity. Microwave drying only works on small amounts of food at a time and requires constant monitoring to ensure the food item does not get burnt. Thus, new methods that do not have these problems are needed.

SUMMARY OF THE INVENTION

In one embodiment, the present invention includes a method for preserving a food product comprising: at least partially enclosing a food product with a water-permeable membrane; and contacting a brine or sugar solution with a water activity sufficiently higher than the target water activity to draw water molecules across the water-permeable membrane and away from the food product to preserve the food. In one aspect, the water-permeable membrane is food compatible. By way of explanation, the brine or sugar solution act as an osmotic fluid under continuous flow such that the osmotic load (salt level) or pull is maintained throughout the process so that it never becomes diluted and/or achieves an equilibrium. In other words, an osmotic difference is maintained at all times and does not stop drying the food product, like systems in which the osmotic fluid is stagnant and stops drying when an equilibrium is achieved. In another aspect, the water-permeable membrane has openings between 1 nanometer and 100 nanometers. In another aspect, the water-permeable membrane prevents the crossing of salts, viruses, bacteria, fungi, or pathogens. In another aspect, the sugar solution is at between 0.90 to 0.82 water activity. In another aspect, the brine solution is at least one of sodium chloride, magnesium chloride, or potassium chloride or magnesium chloride brine solution. In another aspect, the brine solution is at between 0.90 and 0.29 water activity. In another aspect, the food product is a meat selected from beef, veal, buffalo, lamb, goat, chicken, pork, emu, ostrich, game hen, squab, guinea fowl, turkey, pheasant, quail, duck, goose, sausage, salami, or other processed meat. In another aspect, the food product is a fruit selected from peach, pear, pineapple, banana, mango, strawberry, raspberry, blackberry, blueberry, cherry, kiwi, gooseberry, apple, melon, grape, apricot, lemon, lime, rhubarb, papaya, plum, prune, grape and cranberry. In another aspect, the food product is a cheese. In another aspect, the method further comprises the step of pasteurizing the food product before, during, or after contacting the brine or sugar solution with the water-permeable membrane. In another aspect, the method further comprises the step of mechanical tenderizing a meat selected before, during, or after contacting the brine or sugar solution with the water-permeable membrane by at least one of pounding, needle tenderizing, injecting, or grinding the meat. In another aspect, the meat is a whole animal, leg, thigh, breast, ribs, flank, loin, sausages, processed meat products, jerky, or other cut of meat, processed or ground meat. In another aspect, the meat is veggie jerky or sausage (heart healthy): a high moisture, softer texture, easy to chew, individually wrapped & shelf-stable with heat & freeze-thaw emulsion, these may include the use of edible casings and post process pasteurization, and one or more of the following bases: Seitan (wheat gluten), Mushroom, Tofu, Pea protein & textured pea protein, Pulse, pinto, garbanzo, or bean paste, soy protein, algae protein, dairy, egg, with or without fermentation with *Pediococcus* sp. In another aspect, the meat is a seafood selected from at least one of:

salmon, herring, sardines, tuna, crab, lobster, oysters, clams. In another aspect, the brine or sugar solution contacts the water-permeable membrane under continuous flow such that an osmotic load is maintained throughout the process and the osmotic load is not diluted, does not achieve an equilibrium, or both.

In another embodiment, the present invention includes a food product made by a method comprising: at least partially enclosing a food product with a water-permeable membrane; and contacting a brine or sugar solution with a water activity sufficiently higher than the target water activity to draw water molecules across the water-permeable membrane and away from the food product to preserve the food. In one aspect, the water-permeable membrane is food compatible. In another aspect, the water-permeable membrane has openings between 1 nanometer and 100 nanometers. In another aspect, the water-permeable membrane prevents the crossing of salts, viruses, bacteria, fungi, or pathogens. In another aspect, the sugar solution is at between 0.90 to 0.82 water activity. In another aspect, the brine solution is at least one of sodium chloride, magnesium chloride, or potassium chloride brine solution. In another aspect, the brine solution is at between 0.90 and 0.29 water activity. In another aspect, the food product is a meat selected from beef, veal, buffalo, lamb, goat, chicken, pork, emu, ostrich, game hen, squab, guinea fowl, turkey, pheasant, quail, duck, goose, sausage, salami, or other processed meat. In another aspect, the food product is a fruit selected from peach, pear, pineapple, banana, mango, strawberry, raspberry, blackberry, blueberry, cherry, kiwi, gooseberry, apple, melon, grape, apricot, lemon, lime, rhubarb, papaya, plum, prune, grape and cranberry. In another aspect, the food product is a cheese. In another aspect, the method further comprises the step of pasteurizing the food product before, during, or after contacting the brine or sugar solution with the water-permeable membrane. In another aspect, the method further comprises the step of mechanical tenderizing a meat selected before, during, or after contacting the brine or sugar solution with the water-permeable membrane by at least one of pounding, needle tenderizing, injecting, or grinding the meat. In another aspect, the meat is a whole animal, leg, thigh, breast, ribs, flank, loin, sausages, processed meat products, jerky, or other cut of meat, processed or ground meat. In another aspect, the meat is veggie jerky or sausage (heart healthy): a high moisture, softer texture, easy to chew, individually wrapped & shelf-stable with heat & freeze-thaw emulsion, these may include the use of edible casings and post process pasteurization, and one or more of the following bases: Seitan (wheat gluten), Mushroom, Tofu, Pea protein & textured pea protein, Pulse, pinto, garbanzo, or bean paste, soy protein, algae protein, dairy, egg, with or without fermentation with *Pediococcus* sp. In another aspect, the meat is a seafood selected from at least one of: salmon, herring, sardines, tuna, crab, lobster, oysters, clams. In another aspect, the brine or sugar solution contacts the water-permeable membrane under continuous flow such that an osmotic load is maintained throughout the process and the osmotic load is not diluted, does not achieve an equilibrium, or both.

In one embodiment, the present invention includes a food product encased in a water permeable membrane made with a continuously flowing, solute saturated solution that continuously pulls water from the food with a water activity sufficient to preserve the food.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention includes the emulsion and its use in a process to tenderize meat, stabilize meat texture, and preserve color in meat and meat products.

The present invention is a method of rapid osmotic drying that uses a saturated salt brine solution moving across a water-permeable membrane in which the food is inside the membrane and the saturated brine is on the outside. In one example of the present invention is a method of rapid osmotic drying that uses a saturated salt brine solution moving across a water-permeable membrane in which the food is vacuum packed inside the membrane and the saturated brine is on the outside.

As used herein, "water activity" refers to the "unbound" free water which is available to microbes and is a term used and measured in the food industry.

Brine composition: Salts like sodium chloride or potassium chloride work best although any substance exerting an osmotic pull can be used (e.g. sugar, glucose). When using sodium chloride the brine will generally be between 25.0% and 26.3% (0.75 water activity). When using potassium chloride the brine will generally be between 32% and 33% (0.80 water activity). When using sugar or glucose to create the osmotic pull, the solution will generally be between 65% and 66.7% (0.82 water activity). When using magnesium chloride the brine will generally be between 30% and 31% (0.29 water activity). All water activities measured with the saturated brine at 60° C. These saturated solutions have a lowered freezing point and higher boiling point so drying can be done below 0° C. and about 100° C.

Brine temperature: Although any temperature will work between freezing the brine or having the brine boil, in some embodiments, the brine between 48.8° C. (120° F.) and 60° C. (140° F.) so that the food is not overcooked in the process, but is still pasteurized. Specific temperatures also include, e.g., 49, 50, 51, 52, 53, 54, 55, 56, 57, 58, or 59° C. In another example, the temperature can be staged to first pasteurized between 60° C. (140° F.) and 73.9° C. (165° F.), and then dried at a lower temperature to preserve the food texture against heat damage. Alternatively, the temperature can be raised to sufficiently inactivate enzymes such as in fruit to be dried or add a low level of gluconic acid to inactivate enzymes and avoid this step. The skilled artisan will recognized that any combination of the above can be used.

Brine flow rate. Water permeable membrane permeability characteristics to allow water to be pulled out and keep salts out. In one example, the flow rate is between 0.1 liter/minute and 25 liters/minute or higher.

Brine saturation. An excess of salt will most often be maintained during the drying process to maximize osmotic drying. Further, as the brine or sugar solution can be reused, as water is pulled from the food, additional salt or sugar may be added to the brine or sugar water to maintain brine saturation.

Membrane. Non-limiting examples of water-permeable membranes with openings that prevent the crossing of viruses, bacteria, fungi, or pathogenic forms of the same for use with the present include, e.g., those taught in U.S. Pat. Nos. 4,277,344, 5,254,261, 5,246,587, 6,015,495, 6,063, 278, 6,245,234, 8,196,754, 8,602,223, 9,504,967, the disclosures of which are also incorporated herein by reference in their entirety. Generally, the water permeable membranes Food product thickness, diameter. The thicker, the slower the drying so that the moisture in the center of the product has time to migrate to the surface. Typically, the thickness of the food product can vary from 0.1 cm to 20 cm, but in certain aspects, 0.2, 0.3. 0.4, 0.5, 0.6, 0.7, 0.8, 0.9, 1.0, 2, 3, 4, 5, 6, 7, 8, 9, 10, 11, 12, 13, 14, 15 16, 17, 18, or 19 cm.

This technology can also be used with any post-process pasteurization process because the membrane is microbiologically impermeable. The product can be dried to 0.90 water activity rather than 0.85 or lower except to achieve a texture at the lower water activities.

Food products recommended for this process: meats and sausages like pepperoni and salami, cheese like parmesan and fruits like apricots or grapes (raisins).

In one example, a saturated solution of magnesium chloride was found to have a much lower water activity than sodium chloride (see Table 1). In one example, drying is faster using magnesium chloride or a blend of sodium chloride and magnesium chloride. Potassium chloride in a saturated solution only has a water activity of 0.85 and is used for applications in which a slower lowering of the water activity is preferred, as opposed to sodium chloride (0.75 water activity) that is much faster. In one example, a water activity of 0.90 can be used for strips of meat (with, e.g., a post process pasteurization to make it shelf-stable) and below 0.85 for jerky (with no oxygen to be shelf-stable), and below 0.70 to be completely shelf-stable (honey, fruits, vegetables, etc.).

| Saturated Salt Solution | Temperature (° C.) | | | | | | | | | | |
| --- | --- | --- | --- | --- | --- | --- | --- | --- | --- | --- | --- |
| | 0 | 5 | 10 | 15 | 20 | 25 | 30 | 35 | 40 | 50 | 60 |
| | | | | | | Water activity | | | | | |
| Magnesium chloride - MgCl$_2$ (saturated at 31%) | 0.34 | 0.34 | 0.33 | 0.33 | 0.33 | 0.33 | 0.32 | 0.32 | 0.32 | 0.31 | 0.29 |
| Potassium chloride - KCl (Saturated at 33% at 20 C.) | 0.89 | 0.88 | 0.87 | 0.86 | 0.85 | 0.84 | 0.84 | 0.83 | 0.82 | 0.81 | 0.8 |
| Sodium chloride - NaCl (Saturated at 26.4%) | 0.76 | 0.76 | 0.76 | 0.76 | 0.75 | 0.75 | 0.75 | 0.75 | 0.75 | 0.74 | 0.75 | will have good performance including high salt rejection and good water flux, increased water flux, high salt rejection, or both. Typically, the membrane will have an average pore size of about micrometers to about 0.01 micrometers and a molecular weight cutoff of about 100 Daltons to about 1000 Daltons. In some examples, the membrane has an average pore size of about 0.001 micrometers or less and a molecular weight cutoff of less than about 100 Daltons. The pore size of ultrafiltration support membranes can be about 1 to about 10 nm.

In one example, magnesium chloride is used to osmotically pull out water with its low water activity in a saturated solution. Meat, seafood and most foods (fruits and vegetables) have a water activity of 0.98.

In another example, a continuously saturated (always maintained as saturated), flowing solution is used to pull water, osmotically, out of a food product that is encased in a water permeable membrane.

However, other salts may be used depending on the application. Such salts and their water activity are taught in Table 2.

| Saturated Salt Solution | Temperature (° C.) | | | | | | | | | | |
| --- | --- | --- | --- | --- | --- | --- | --- | --- | --- | --- | --- |
| | 0 | 5 | 10 | 15 | 20 | 25 | 30 | 35 | 40 | 50 | 60 |
| | | | Relative Humidity over the Salt Solution (%) | | | | | | | | |
| Ammonium nitrate - NH$_4$NO$^3$ | | | 75 | 70 | 67 | 64 | 60 | 53 | | | |

-continued

| Saturated Salt Solution | Temperature (° C.) | | | | | | | | | | |
|---|---|---|---|---|---|---|---|---|---|---|---|
| | 0 | 5 | 10 | 15 | 20 | 25 | 30 | 35 | 40 | 50 | 60 |
| | Relative Humidity over the Salt Solution (%) | | | | | | | | | | |
| Ammonium sulphate - (NH$_4$)$_2$SO$_4$ | 82 | 82 | 82 | 82 | 81 | 81 | 81 | 80 | 80 | 79 | |
| Lithium chloride - LiCl [1] | | | | | 11.31 | 11.35 | 11.28 | 11.25 | 11.21 | 11.1 | 10.95 |
| Magnesium chloride - MgCl$_2$ | 34 | 34 | 33 | 33 | 33 | 33 | 32 | 32 | 32 | 31 | 29 |
| Magnesium nitrate - Mg(NO$_3$)$_2$ | 60 | 59 | 57 | 56 | 54 | 53 | 51 | 50 | 48 | 45 | |
| Natrium Chloride - NaCl [1] | 75.51 | 75.65 | 75.67 | 75.61 | 75.47 | 75.29 | 75.09 | 74.87 | | | |
| Potassium sulphate - K$_2$SO$_4$ | 99 | 98 | 98 | 98 | 98 | 97 | 97 | 97 | 96 | 96 | |
| Potassium nitrate KNO$_3$ | 96 | 96 | 96 | 95 | 95 | 94 | 92 | 91 | 89 | 85 | |
| Potassium chloride - KCl | 89 | 88 | 87 | 86 | 85 | 84 | 84 | 83 | 82 | 81 | 80 |
| Potassium acetate - CH$_3$CO$_2$K | | | 23 | 23 | 23 | 23 | 22 | | | | |
| Potassium hydroxide - KOH | | 14 | 12 | 11 | 9 | 8 | 7 | 7 | 6 | 6 | 5 |
| Sodium chloride - NaCl | 76 | 76 | 76 | 76 | 75 | 75 | 75 | 75 | 75 | 74 | 75 |
| Sodium nitrite - NaNO$_2$ | | | | | 65 | 64 | 63 | 62 | 61 | | |
| Sodium dichromate - Na$_2$Cr$_2$O$_7$ | 61 | 59 | 57 | 57 | 55 | 54 | 53 | 51 | 50 | 49 | 47 |

EXAMPLES

Raw pepperoni sausage, extruded into ~4.5 cm water permeable casing, fermented to a pH of 4.5 to 4.7, with a water activity of 0.98 was dried to a water activity of 0.87 over a 70 to 74 hour period with a continuously saturated salt (sodium chloride) solution flowing over the outer casing wall at the rate of 1 liter/minute at 60° C. The resulting water activity was 0.86. The saturated salt solution was at about 26.4% salt in solution with excess salt crystals and a water activity of 0.75.

Veggie jerky or sausage (heart healthy). A high moisture, softer texture, easy to chew, individually wrapped & shelf-stable with heat & freeze-thaw emulsion. Use edible casings and post process pasteurization. The bases can include one or more of the following: Seitan (wheat gluten); mushroom; tofu; pea protein & textured pea protein; pulse, pinto, garbanzo, bean based paste, etc.; textured soy protein; algae protein; dairy and/or egg, +/−fermentation with *Pediococcus* sp.

Seafood such as salmon, herring, sardines, tuna, crab, lobster, oysters, clams, etc. The present invention would be perfect for drying salmon and many other fish such as used in, e.g., Asian dishes.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (0, or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method for preserving a food product comprising:
at least partially enclosing a food product with a water-permeable membrane; and
contacting the water-permeable membrane enclosing the food product with a brine solution, a sugar solution, or both the brine solution and sugar solution having a water activity sufficiently high to draw water molecules across the water-permeable membrane and away from the food product to preserve the food.

2. The method of claim 1, wherein the water-permeable membrane is at least one of: food compatible, has openings between 1 nanometer and 100 nanometers, or prevents the crossing of salts, viruses, bacteria, fungi, or pathogens.

3. The method of claim 1, wherein the sugar solution has a water activity of between 0.90 to 0.82.

4. The method of claim 1, wherein the brine solution comprises at least one of sodium chloride, magnesium chloride, or potassium chloride and a water activity of about 0.85 to 0.29, or a water activity of 0.85, 0.7, 0.6, 0.5, 0.4, 0.3, or less.

5. The method of claim 1, wherein the food product is a meat selected from beef, veal, buffalo, lamb, goat, chicken, pork, emu, ostrich, game hen, squab, guinea fowl, turkey, pheasant, quail, duck, goose, sausage, salami, or other processed meat, or is a seafood selected from at least one of: salmon, herring, sardines, tuna, crab, lobster, oysters, clams, or a cheese.

6. The method of claim 1, wherein the food product is a fruit selected from peach, pear, pineapple, banana, mango, strawberry, raspberry, blackberry, blueberry, cherry, kiwi, gooseberry, apple, melon, grape, apricot, lemon, lime, rhubarb, *papaya*, plum, prune, grape and cranberry.

7. The method of claim 1, further comprising pasteurizing the food product before, during, or after contacting the water-permeable membrane enclosing the food product with the brine solution, sugar solution, or both; and a step of mechanical tenderizing a meat selected before, during, or after contacting the brine solution, sugar solution, or both by at least one of pounding, needle tenderizing, injecting, grinding the meat, or combinations thereof.

8. The method of claim 1, wherein the meat is a whole animal, leg, thigh, breast, ribs, flank, loin, sausages, processed meat products, jerky, or other cut of meat, processed or ground meat.

9. The method of claim 1, wherein the brine comprises a salt selected from at least one of: Magnesium chloride—$MgCl_2$, Potassium chloride—$KCl$, Sodium chloride—$NaCl$, Ammonium nitrate—$NH_4NO_3$, Ammonium sulphate—$(NH_4)_2SO_4$, Lithium chloride—$LiCl$), Magnesium chloride—$MgCl_2$, Magnesium nitrate—$Mg$ $(NO_3)_2$, Natrium Chloride—$NaCl^1$), Potassium sulphate—$K_2SO_4$, Potassium nitrate—$KNO_3$, Potassium chloride—$KCl$, Potassium acetate—$CH_3CO_2K$, Potassium hydroxide—$KOH$, Sodium chloride—$NaCl$, Sodium nitrite—$NaNO_2$, or Sodium dichromate—$Na_2Cr_2O_7$.

10. The method of claim 1, wherein the meat is veggie jerky or sausage (heart healthy): a moisture, texture, chewable, individually wrapped, shelf-stable with heat, and freeze-thaw emulsion, or combinations thereof, and may further include the use of: edible casings and post process pasteurization, and one or more of the following bases:

seitan (wheat gluten), mushroom, tofu, pea protein, textured pea protein, pulse, pinto, garbanzo, or bean paste, soy protein, algae protein, dairy, egg, with or without fermentation with *Pediococcus* sp.

11. The method of claim 1, wherein the brine solution, sugar solution, or both contacts the water-permeable membrane under continuous flow such that an osmotic load is maintained throughout the method and the osmotic load is not diluted, does not achieve an equilibrium, or both.

\* \* \* \* \*